(12) United States Patent
Lee et al.

(10) Patent No.: US 7,782,966 B2
(45) Date of Patent: Aug. 24, 2010

(54) DEMODULATOR OF BASE STATION IN ORTHOGONAL FREQUENCY DIVISION MULTIPLE ACCESS

(75) Inventors: Young-Ha Lee, Daejeon (KR); Youn-Ok Park, Daejeon (KR)

(73) Assignees: Electronics and Telecommunications Research Institute, Daejeon (KR); Samsung Electronics Co., Ltd., Suwon-si (KR); KT Corporation, Seongnam (KR); SK Telecom Co., Ltd., Seoul (KR); KTFREETEL Co., Ltd, Seoul (KR); Hanaro Technologies, Inc., Seoul (KR)

( * ) Notice: Subject to any disclaimer, the term of this patent is extended or adjusted under 35 U.S.C. 154(b) by 642 days.

(21) Appl. No.: 11/721,155

(22) PCT Filed: Nov. 9, 2005

(86) PCT No.: PCT/KR2005/003791

§ 371 (c)(1),
(2), (4) Date: Jun. 7, 2007

(87) PCT Pub. No.: WO2006/062297

PCT Pub. Date: Jun. 15, 2006

(65) Prior Publication Data

US 2009/0225904 A1    Sep. 10, 2009

(30) Foreign Application Priority Data

Dec. 11, 2004  (KR) ............. 10-2004-0104639
Apr. 27, 2005  (KR) ............. 10-2005-0035006

(51) Int. Cl.
*H04L 27/28* (2006.01)

(52) U.S. Cl. .............. 375/260; 375/267; 375/279; 375/329; 370/319; 370/437

(58) Field of Classification Search .......... 375/140, 375/141, 147, 260, 267, 279, 329, 340; 370/208, 370/319–321, 329, 330, 335, 342, 431, 437, 370/441, 465, 478–480; 455/17, 509, 517, 455/67.11, 69, 115.1, 115.3, 214, 226.1–226.4
See application file for complete search history.

(56) References Cited

U.S. PATENT DOCUMENTS 6,754,473 B1 *  6/2004  Choi et al. .............. 455/101

(Continued)

FOREIGN PATENT DOCUMENTS

KR   10-2003-0019210 A     3/2003

(Continued)

*Primary Examiner*—Dac V Ha
(74) *Attorney, Agent, or Firm*—Jefferson IP Law, LLP

(57) ABSTRACT

A base station demodulator according to the exemplary embodiment of the present invention includes a vector index demodulator, and a channel value detector. The vector index demodulator demodulates CQI or ARQ ACK/NACK channels by multiplying QPSK modulation signals transmitted as m subcarriers in a tile by m conjugate complexes corresponding to the m subcarriers, and determines the greatest value of the demodulation results as a vector index. The channel value detector inputs n vector indexes demodulated by the vector index demodulator to a first shift register, inputs n subsequent vector indexes to a second shift register, and detects a channel value for the CQI or the ARQ ACK/NACK by repeating the above vector index input to the first and second shift registers m-times.

10 Claims, 6 Drawing Sheets

U.S. PATENT DOCUMENTS

| | | |
|---|---|---|
| 7,079,514 B2 * | 7/2006 | Kim et al. .................... 370/335 |
| 7,400,674 B2 * | 7/2008 | Gu ............................. 375/225 |
| 2004/0190486 A1 | 9/2004 | Shigeomi |
| 2004/0248606 A1 | 12/2004 | Suzuki |
| 2006/0203727 A1 * | 9/2006 | Aizawa et al. .............. 370/235 |

FOREIGN PATENT DOCUMENTS

| | | |
|---|---|---|
| KR | 10-2003-0077732 A | 10/2003 |
| WO | 03/034646 A2 | 4/2003 |

* cited by examiner

DEMODULATOR OF BASE STATION IN ORTHOGONAL FREQUENCY DIVISION MULTIPLE ACCESS

TECHNICAL FIELD

The present invention relates to a base station demodulator in an orthogonal frequency division multiplexing access method. More specifically, the present invention relates to a base station demodulator for demodulating uplink channel quality information (CQI) or an automatic repeat request (ARQ) acknowledgement/negative-acknowledgement (ACK/NACK) transmitted from a subscriber to a base station in a multiple access wireless communication system using an orthogonal frequency division multiplexing access (OFDMA) method.

BACKGROUND ART

In a wireless access standard being applied to a physical layer of an IEEE 802.16d wireless metropolitan area network (NAN)-OFDMA, a downlink access standard from a base station to a subscriber station and an uplink access standard from the subscriber to the base station in a time-divided manner are provided.

When the subscriber transmits downlink channel quality information (CQI) to the base station through an uplink by measuring a downlink channel quality, the subscriber station transmits the CQI through a predetermined subchannel of the physical channel. At this time, the predetermined subchannel is determined by a cell identifying number (cell ID) of the base station, and allocated to respective subscribers according to the number of CQI channels of the base station. In addition, a downlink channel quality value measured by the subscriber station is quadrature-modulated to the CQI, and transmitted to the base station.

A channel for automatic repeat request (ARQ) acknowledgement/negative-acknowledgement (ACK/NACK) is also transmitted in a like manner of the CQI, but a subchannel allocation method is different.

Therefore, demodulators corresponding to the number of transmit channels are required since the base station demodulator detects and demodulates the CQI and the ARQ ACK/NACK channel transmitted from a plurality of subscriber stations.

As prior art, "an apparatus and a method for coding and decoding of CQI in communication system using high speed downlink packet access scheme" has been disclosed in Korean Patent Application No. 2002-16561 filed in the Korean Intellectual Property Office on Mar. 26, 2002, which relates to an apparatus and method for coding and decoding CQI in a code division multiple access (CDMA) communication system using a high speed downlink packet access (HSDPA), and more particularly to an apparatus and method for coding and decoding CQI to insert a pilot signal into a high speed-physical downlink shared channel (HS-PDSCH) and to transmit the HS-PDSCH having the pilot signal inserted therein such that power of a high speed uplink control channel can be controlled.

In this patent, the CQI is transmitted by coding and decoding the CQI in the CDMA communication system.

In addition, "an apparatus and method for transmitting and receiving forward channel quality information in a mobile communication system" has been disclosed in Korean Patent Application No. 2002-51632 filed in the Korean Intellectual Property Office on Oct. 29, 2002, which relates to a mobile communication system that supports a multimedia service including voice and data services, and more particularly to an apparatus and method for transmitting and receiving information indicating a forward data rate between a mobile station and a base station.

In this patent, relative and absolute values of the CQI measured in the downlink are defined, and a method for transmitting the CQI in the CDMA communication system has been disclosed.

In addition, "a method and apparatus for channel quality measurements" has been described in Korean Patent Application No. 2004-7005680 filed on Apr. 16, 2004, which relates to a method and apparatus for measuring an OFDM channel quality.

In the HSDPA of a universal mobile telecommunications system (UMTS), the CQI is transmitted through a channel quality information channel (CQICH), and is modulated and coded by a CQI coder and a Walsh modulator. That is, the subcarrier of the subchannel is quadrature-modulated in the conventional HSDPA method.

In other words, the CQI and ACK/NACK in the OFDMA method may not be demodulated in the conventional HSDPA method since the HSDPA method is different from an OFDMA standard in which coding and modulating operations are not performed.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a base station demodulator for demodulating channel quality information (CQI) or an automatic repeat request (ARQ) response signal transmitted from a subscriber station to a base station.

Technical Solution

An exemplary base station demodulator according to an embodiment of the present invention includes a vector index demodulator and a channel value detector. The vector index demodulator demodulates channel quality information (CQI) tiles or ARQ ACK/NACK channel tiles by multiplying quadrature phase shift keying (QPSK) modulation signals transmitted as m subcarriers in a tile by m conjugate complexes corresponding to the m subcarriers, and determines the greatest value of the demodulation results as a vector index when the CQI information tiles or the ARQ ACK/NACK channel tiles are sequentially inputted. The channel value detector inputs n vector indexes demodulated by the vector index demodulator to a first shift register, inputs n subsequent vector indexes to a second shift register, and detects a channel value for the CQI information or the ARQ ACK/NACK by repeating the above vector index inputs to the first and second shift registers m-times.

Advantageous Effects

According to the exemplary embodiment of the present invention, the uplink CQI and ACK/NACK for the ARQ from the subscriber station to the base station may be easily demodulated and detected.

BEST MODE FOR CARRYING OUT THE INVENTION

An embodiment of the present invention will hereinafter be described in detail with reference to the accompanying drawings.

In an orthogonal frequency division multiplexing access (OFDMA) system, a subscriber station SS measures a downlink channel quality and transmits the downlink channel quality to a base station BS through an uplink. At this time, the base station allocates a channel to the downlink according to the measured channel quality, and a demodulator of the base station performs demodulation and detection on a transmit channel when the transmit channel transmitted to the uplink is a physical channel.

In addition, since response signals ACK/NACK for an automatic repeat request (ARQ) of a subscriber station are also transmitted through the uplink physical channel in a like manner of the above channel quality measurement, the response signals ACK/NACK are required to be demodulated and detected.

Accordingly, in an exemplary embodiment of the present invention, a configuration of the base station demodulator for demodulating channel quality information (CQI) transmitted by the subscriber station and the ARQ response signals ACK/NACK and for detecting channel values for the CQI and the ARQ response ACK/NACK signals will be described.

The downlink channel quality measured by the subscriber station is divided into 32 levels, and the measured channel quality in 32 levels may be initially measured values (full CQI) or values obtained by differences from previous values (differential CQI). That is, the downlink channel quality is expressed by channel carrier to interference ratios (CINR) divided into 32 levels from below −3☐ to over 27☐.

In addition, the CQI of 32 levels may be expressed by 5-bit information, and the 5-bit information is respectively mapped as vector indexes, allocated to one subchannel, and transmitted to the base station. At this time, one subchannel mapped as the vector indexes includes six tiles, as shown in FIG. 1.

Figure 1:
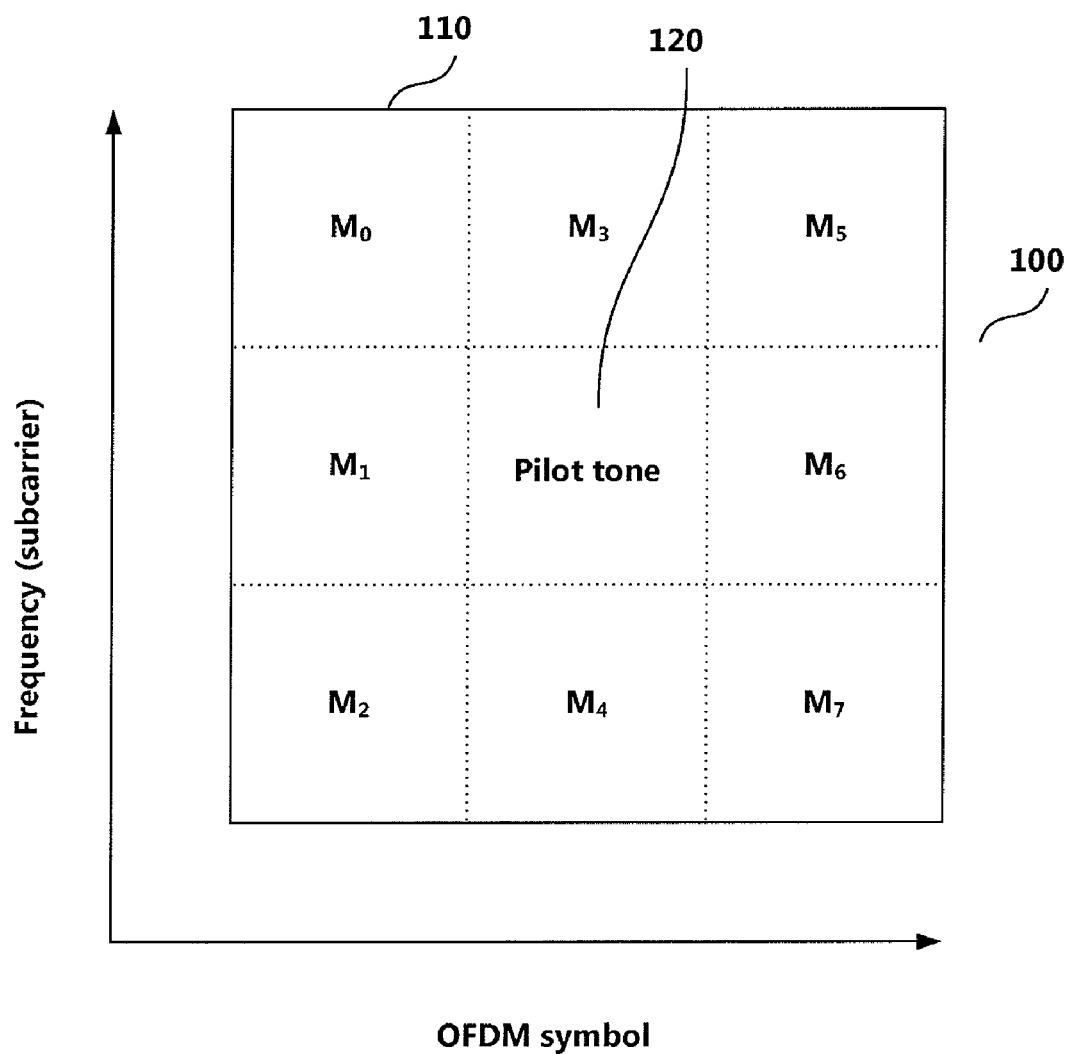
FIG. 1 shows a diagram of a configuration of a tile which is a basic unit for subchannel allocation in an orthogonal frequency division multiplexing access (OFDMA) uplink control channel.

FIG. 1 shows a diagram of a configuration of a tile which is a basic unit for subchannel allocation in an OFDMA uplink control channel.

In an OFDMA uplink control channel, 6 tiles form one subchannel, and, as shown in FIG. 1, each tile 100 includes 9 subcarriers 110 (i.e., 3 subcarriers in each of the frequency and OFDM symbol axes). That is, the tile 100 expresses a vector index from 0 to 7 as shown in Table 1. In other words, one CQI channel includes 6 tiles 100, and the respective tiles 100 express the respective vector indexes from 0 to 7.

For example, a channel CINR over 27.0☐ is expressed as 5-bit information of 11111, and the vector indexes mapped into the 6 tiles (i.e., tile 0 to tile 5) are respectively 3, 5, 7, 1, 4, and 6.

The ACK/NACK for the ARQ in an ACK/NACK channel is expressed as shown in Table 2. While the CQI channel includes 6 tiles, the ACK/NACK channel includes three tiles, and the respective tiles express vector indexes of 0, 2, 4, and 7.

In further detail, the ACK/NACK is expressed by one-bit. For example, the ACK is expressed by 0, the NACK is expressed by 1, the vector indexes mapped into the three tiles (i.e., tile 0, tile1, and tile2) for the ACK are 0, 0, and 0, and the same for the NACK are 4, 7, and 2.

A relation for mapping the vector index to the tile as shown in Table 1 and Table 2 is as shown in Table 3. P0, P1, P2, and P3 denote quadrature phase shift keying (QPSK) modulation signals.

That is, as shown in FIG. 1, the tile 100 includes 9 subcarriers 110, and 8 subcarriers 110 from M0 to M7, except the center subcarrier, express the vector indexes from 0 to 7 by being mapped as the values shown in Table 3. The center subcarrier is a pilot tone 120 for channel estimation.

TABLE 1

| channel CINR [dB] (Full CQI) | 5 bit information (Full or differential CQI value) | Vector index mapped into tile 0 to tile 5 |
|---|---|---|
| Below −3.0 | 00000 | 0, 0, 0, 0, 0, 0 |
| −3.0 to 2.0 | 00001 | 1, 1, 1, 1, 1, 1 |
| −2.0 to 1.0 | 00010 | 2, 2, 2, 2, 2, 2 |
| −1.0 to 0.0 | 00011 | 3, 3, 3, 3, 3, 3 |
| 0.0 to 1.0 | 00100 | 4, 4, 4, 4, 4, 4 |
| 1.0 to 2.0 | 00101 | 5, 5, 5, 5, 5, 5 |
| 2.0 to 3.0 | 00110 | 6, 6, 6, 6, 6, 6 |
| 3.0 to 4.0 | 00111 | 7, 7, 7, 7, 7, 7 |
| 4.0 to 5.0 | 01000 | 0, 1, 2, 3, 4, 5 |
| 5.0 to 6.0 | 01001 | 1, 2, 3, 4, 5, 6 |
| 6.0 to 7.0 | 01010 | 2, 3, 4, 5, 6, 7 |
| 7.0 to 8.0 | 01011 | 3, 4, 5, 6, 7, 0 |
| 8.0 to 9.0 | 01100 | 4, 5, 6, 7, 0, 1 |
| 9.0 to 10.0 | 01101 | 5, 6, 7, 0, 1, 2 |
| 10.0 to 11.0 | 01110 | 6, 7, 0, 1, 2, 3 |
| 11.0 to 12.0 | 01111 | 7, 0, 1, 2, 3, 4 |
| 12.0 to 13.0 | 10000 | 4, 7, 2, 5, 1, 6 |
| 13.0 to 14.0 | 10001 | 5, 0, 3, 6, 2, 7 |
| 14.0 to 15.0 | 10010 | 6, 1, 4, 7, 3, 0 |
| 15.0 to 16.0 | 10011 | 7, 2, 5, 0, 4, 1 |
| 16.0 to 17.0 | 10100 | 0, 3, 6, 1, 5, 2 |
| 17.0 to 18.0 | 10101 | 1, 4, 7, 2, 6, 3 |
| 18.0 to 19.0 | 10110 | 2, 5, 0, 3, 7, 4 |
| 19.0 to 20.0 | 10111 | 3, 6, 1, 4, 0, 5 |
| 20.0 to 21.0 | 11000 | 4, 6, 0, 2, 5, 7 |
| 21.0 to 22.0 | 11001 | 5, 7, 1, 3, 6, 0 |
| 22.0 to 23.0 | 11010 | 6, 0, 2, 4, 7, 1 |
| 23.0 to 24.0 | 11011 | 7, 1, 3, 5, 0, 2 |
| 24.0 to 25.0 | 11100 | 0, 2, 4, 6, 1, 3 |
| 25.0 to 26.0 | 11101 | 1, 3, 5, 7, 2, 4 |
| 26.0 to 27.0 | 11110 | 2, 4, 6, 0, 3, 5 |
| Over 27.0 | 11111 | 3, 5, 7, 1, 4, 6 |

TABLE 2

| 1 bit information | Vector index mapped into tile 0, tile, 1, and tile 2 |
|---|---|
| 0 (ACK) | 0, 0, 0 |
| 1 (NACK) | 4, 7, 2 |

TABLE 3

| Vector index | Subcarrier | | | | | | | |
|---|---|---|---|---|---|---|---|---|
| | M0 | M1 | M2 | M3 | M4 | M5 | M6 | M7 |
| 0 | P0 | P1 | P2 | P3 | P0 | P1 | P2 | P3 |
| 1 | P0 | P3 | P2 | P1 | P0 | P3 | P2 | P1 |
| 2 | P0 | P0 | P1 | P1 | P2 | P2 | P3 | P3 |
| 3 | P0 | P0 | P3 | P3 | P2 | P2 | P1 | P1 |
| 4 | P0 | P0 | P0 | P0 | P0 | P0 | P0 | P0 |
| 5 | P0 | P2 | P0 | P2 | P0 | P2 | P0 | P2 |
| 6 | P0 | P2 | P0 | P2 | P2 | P0 | P2 | P0 |
| 7 | P0 | P2 | P2 | P0 | P2 | P0 | P0 | P2 |

Figure 2:
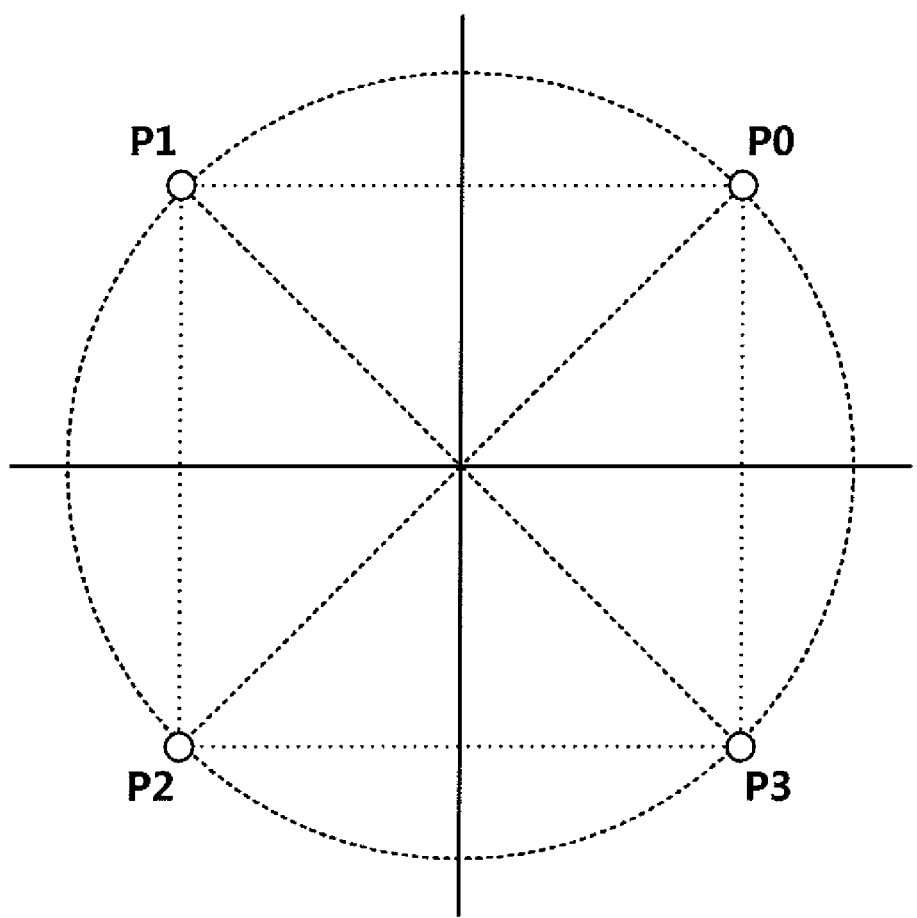
FIG. 2 shows a diagram for representing subcarriers having an orthogonal characteristic in the tile shown in FIG. 1.

FIG. 2 shows a diagram for representing a subcarrier 110 having an orthogonal characteristic in the tile 100 shown in FIG. 1, and P0, P1, P2, and P3, corresponding to the mapped vector indexes, correspond to the QPSK modulation signals.

That is, P0, P1, P2, and P3 in Table 3 correspond to the QPSK modulation signals as shown in FIG. 2, and values thereof are as shown in Math Figure 1.

Math FIG. 1

$$P0 = \exp(j \cdot \frac{\pi}{4}), \quad P1 = \exp(j \cdot \frac{3\pi}{4}),$$
$$P2 = \exp(-j \cdot \frac{3\pi}{4}), \quad P3 = \exp(-j \cdot \frac{\pi}{4})$$

As described above, when the subscriber station SS transmits the CQI or ACK/NACK to an uplink channel allocated to the subscriber station, the base station demodulator performs demodulation and detection on the CQI or ACK/NACK.

Figure 3:
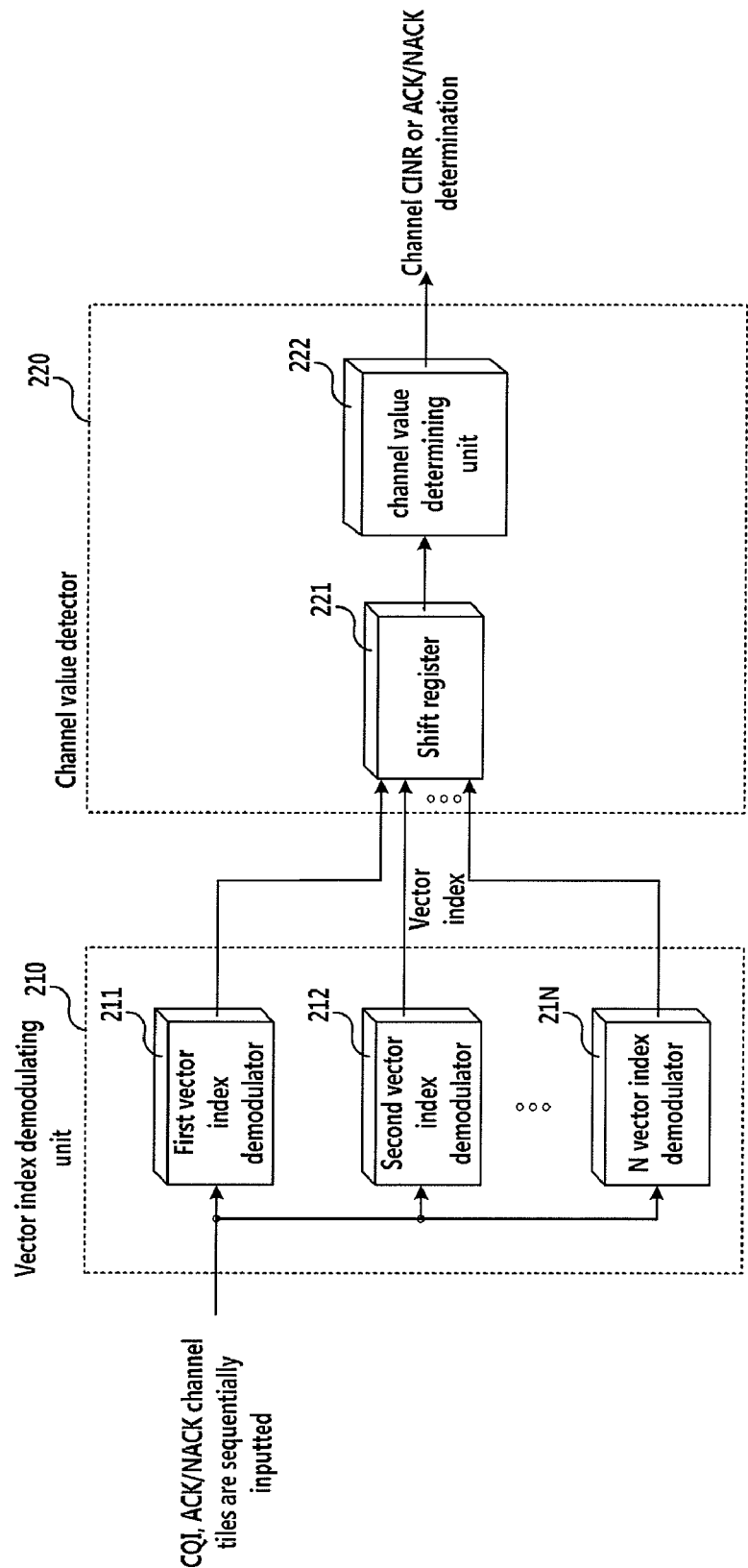
FIG. 3 shows a schematic diagram of a base station demodulator for demodulating channel quality information and response channels according to an exemplary embodiment of the present invention.

FIG. 3 shows a schematic diagram of a base station demodulator for demodulating the CQI and response channels according to the exemplary embodiment of the present invention.

As shown in FIG. 3, the base station demodulator for demodulating the CQI and response channels according to the exemplary embodiment of the present invention includes a vector index demodulating unit 210 and a channel value detector 220 for demodulating the CQI or the response signal for the ARQ transmitted from the subscriber station to the base station.

The vector index demodulating unit 210 includes a plurality of vector index demodulators 211, 212, . . . , and 213. When tiles of the CQI or ARQ ACK/NACK are sequentially inputted, the vector index demodulating unit 210 demodulates the QPSK modulation signals transmitted by using the 8 subcarriers in the tile by multiplying the QPSK modulation signals by conjugate complexes corresponding to the 8 subcarriers, and determines the greatest value of the demodulation results as a corresponding vector index.

The channel value detector 220, including a shift register 221 and a channel value determining unit 222, detects a channel value for the CQI or the ACK/NACK for the ARQ by inputting 6 vector indexes demodulated by the vector index demodulating unit 210 to a first shift register, inputting subsequent vector indexes to a second shift register, and repeating the vector index inputs to the first and second shift registers eight times.

In further detail, when the CQI or the ACK/NACK is transmitted from the subscriber station to the base station demodulator, the vector index is to be detected from a tile of the allocated subchannel. To detect the vector index from the tile of the allocated subchannel, it is required to demodulate the QPSK signals transmitted as 8 subcarriers in one tile. That is, the vector indexes in Table 3 are detected by demodulating P0, P1, P2, and P3, and a method for demodulating P0, P1, P2, and P3 will now be described.

The QPSK signals P0, P1, P2, and P3 are respectively 1 when the QPSK signals are respectively multiplied by conjugate complexes of the QPSK signals, and the QPSK signals P0, P1, P2, and P3 are respectively 0 when the QPSK signals are respectively multiplied by other conjugate complexes. P0*, P1*, P2*, and P3* denote the conjugate complexes as shown in Math Figure 2.

Math FIG. 2

$$P0^* = \exp(-j \cdot \frac{\pi}{4}), \quad P1^* = \exp(-j \cdot \frac{3\pi}{4}),$$
$$P2^* = \exp(j \cdot \frac{3\pi}{4}), \quad P3^* = \exp(j \cdot \frac{\pi}{4})$$

The vector indexes are demodulated by multiplying the QPSK signals by conjugate complexes corresponding to the 8 subcarriers in Table 3. For example, the subcarriers in the tile are P0, P1, P2, P3, P0, P1, P2, and P3 when the vector index '0' is transmitted, and it will be as shown in Math Figure 3 when the QPSK signals are demodulated by being multiplied by conjugate complexes P0*, P1*, P2*, P3*, P0*, P1*, P2*, and P3*. In addition, when the vector index '1' is transmitted, the subcarriers are P0, P3, P2, P1, P0, P3, P2, and P1, and are respectively established from the vector indexes 2 to 7 according to the orthogonal characteristic.

MathFigure 3

(P0×P0*)+(P1×P1*)+(P2×P2*)+(P3×P3*)+(P0×P0*)+(P1×P1*)+(P2×P2*)+(P3×P3*)

Figure 4:
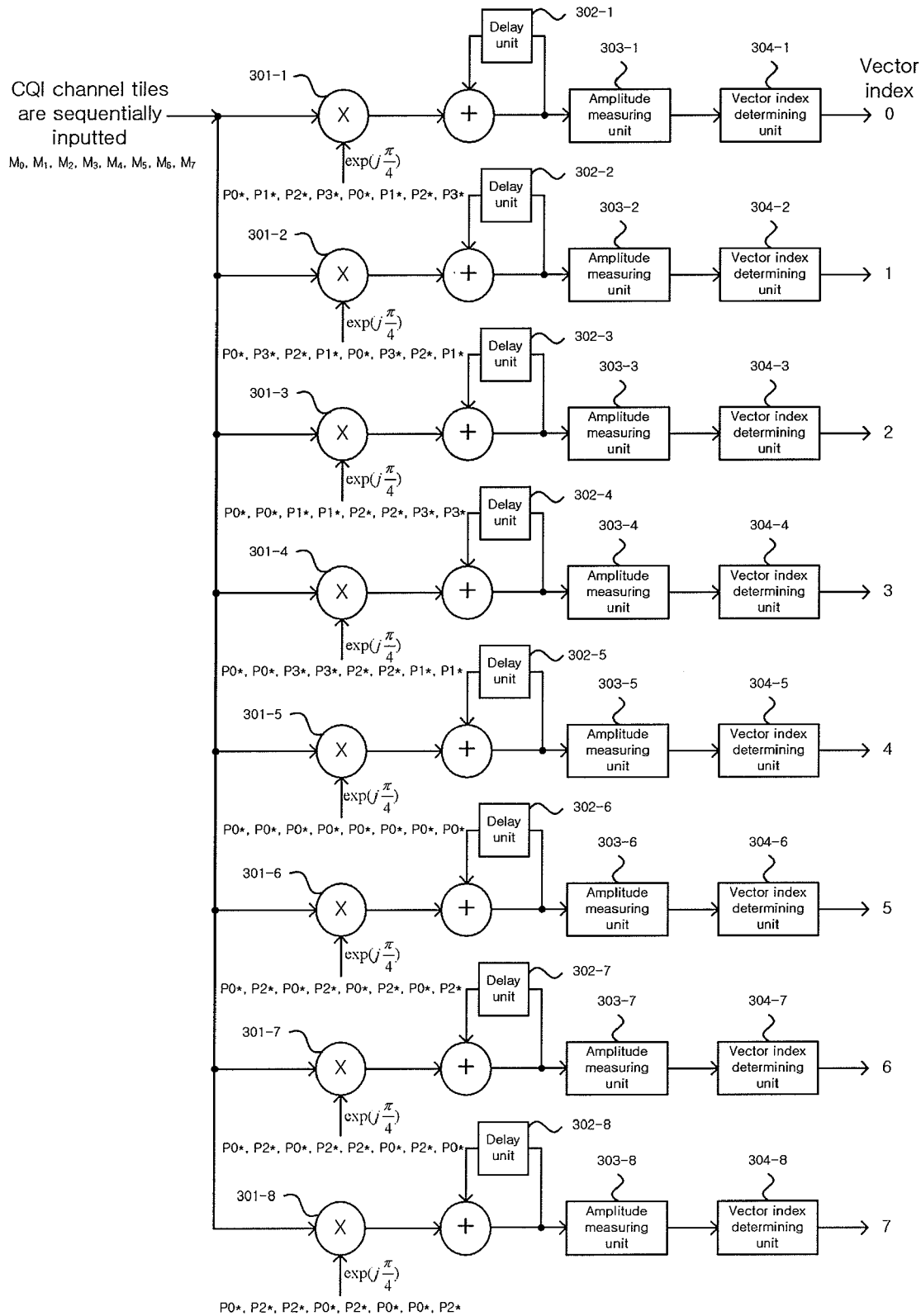
FIG. 4 shows a schematic diagram of a vector index demodulator of the base station demodulator according to the exemplary embodiment of the present invention.

Math Figure 3 is expanded as shown in Math Figure 4.

Math Figure 4

2(P0×P0*)+2(P1×P1*)+2(P2×P2*)+2(P3×P3*)=8

At this time, the result of the demodulation on other vector indexes becomes a value less than 8 according to the orthogonal modulation characteristic. For example, when the QPSK signals P0, P1, P2, P3, P0, P1, P2, and P3 are multiplied by the conjugate complexes P0*, P3*, P2*, P1*, P0*, P3*, P2*, and P1*, it will be as (P0×P0*)+(P1×P3*)+(P2×P2*)+(P3×P0*)+(P0×P0*)+(P1×P3*)+(P2×P2*)+(P3×P0*) and a demodulation result thereof will be 4. In other words, since the result of other vector index demodulation is less than 8, the vector index 0 is outputted when the demodulation result is 8.

Figure 5:
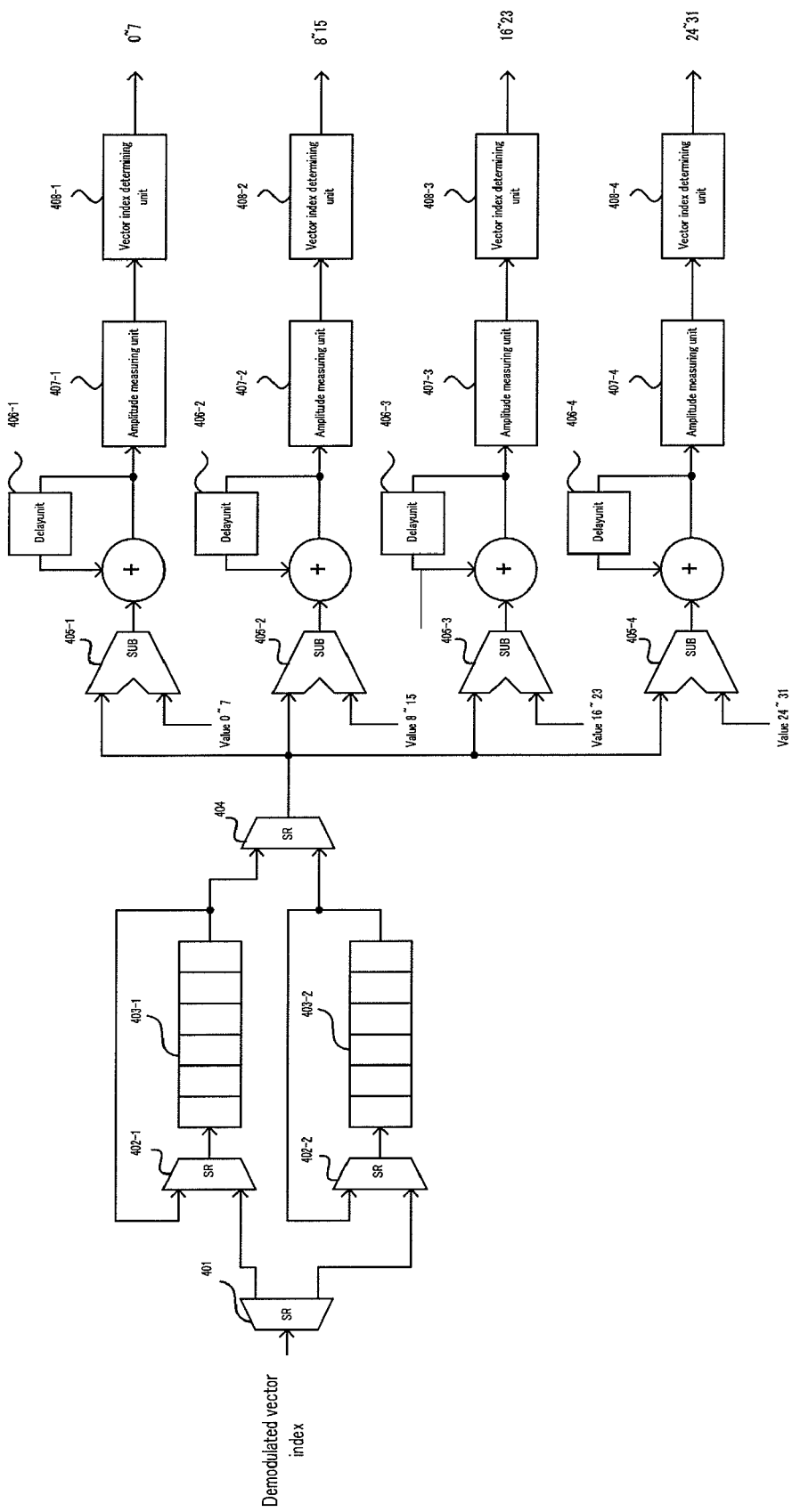
FIG. 5 shows a schematic diagram of a configuration of a channel value detector of the base station demodulator according to the exemplary embodiment of the present invention.

When the conjugate complexes in the above case are multiplied by $$\exp(j \cdot \frac{\pi}{4}),$$

it will be as shown in Math Figure 5

Math FIG. 5

$$(P0 \times P0^* \times \exp(j\frac{\pi}{4})) + (P1 \times P1^* \times \exp(j\frac{\pi}{4})) +$$

-continued $$(P2 \times P2^* \times \exp(j\tfrac{\pi}{4})) + (P3 \times P3^* \times \exp(j\tfrac{\pi}{4})) +$$

$$(P0 \times P0^* \times \exp(j\tfrac{\pi}{4})) + (P1 \times P1^* \times \exp(j\tfrac{\pi}{4})) +$$

$$(P2 \times P2^* \times \exp(j\tfrac{\pi}{4})) + (P3 \times P3^* \times \exp(j\tfrac{\pi}{4})) = 8 \times \exp(j\tfrac{\pi}{4})$$

In Math Figure 4 and Math Figure 5, results having equal values but different phases from each other by 45° may be obtained.

That is, since the vector index is detected when it is greater than a predetermined threshold value, the vector index may be detected when Math Figure 5 is expanded. For example, hardware may be simply designed when the demodulation is performed as shown in Math Figure 5. That is, since $$P0^* \times \exp(j\tfrac{\pi}{4})$$

is 1, $$P1^* \times \exp(j\tfrac{\pi}{4})$$

is j, $$P2^* \times \exp(j\tfrac{\pi}{4})$$

is −1, and $$P3^* \times \exp(j\tfrac{\pi}{4})$$

is j instead of

P0*

, the conjugate complex may be multiplied without a multiplier and an adder.

FIG. 4 shows a diagram of a configuration of a vector index demodulator of the base station demodulator according to the exemplary embodiment of the present invention, and the configuration is for detecting 8 vector indexes from 0 to 7 in parallel.

301-1 to 301-8 denote multiplexers which may actually be realized by mark inversion or exchange between real and imaginary parts. 302-1 to 302-8 denote delay units for adding 8 values obtained by multiplying the 8 conjugate complexes, 303-1 to 303-8 denote amplitude measuring units, and 304-1 to 304-8 denote vector index determining units.

After detecting the vector index as described above, the CQI channel or ACK/NACK channel value is determined by determining a value having the least difference between the vector indexes and values in Table 1 or Table 2 to find out the mapping results of Table 1 and Table 2.

FIG. 5 shows a schematic diagram of a configuration of a channel value detector of the base station demodulator according to the exemplary embodiment of the present invention.

As shown in FIG. 5, the CQI and response channel value detector according to the exemplary embodiment of the present invention inputs 6 demodulated vector indexes to a first sift register, and inputs 6 subsequent vector indexes to a second shift register. The CQI channel value is detected by repeatedly inputting the vector indexes to the first and second shift registers eight times. Here, 401, 402-1, 402-2, and 404 denote shift registers, and 403-1 and 403-2 respectively denote 6 vector indexes.

Here, 405-1 to 405-4 denote subtractors for respectively subtracting one of the values of the 32 levels (0 to 31) from values inputted from the shift register 404, 406-1 to 4064 denote delay units, and 408-1 to 408-4 denote determining units for determining the vector index. The determining units determine one of the values from 0 to 31.

In the above configuration shown in FIG. 5, the CQI channel is detected as the value having the least difference in Table 1 or Table 2. The ACK/NACK channel is also detected in a like manner of the CQI channel detection.

Figure 6:
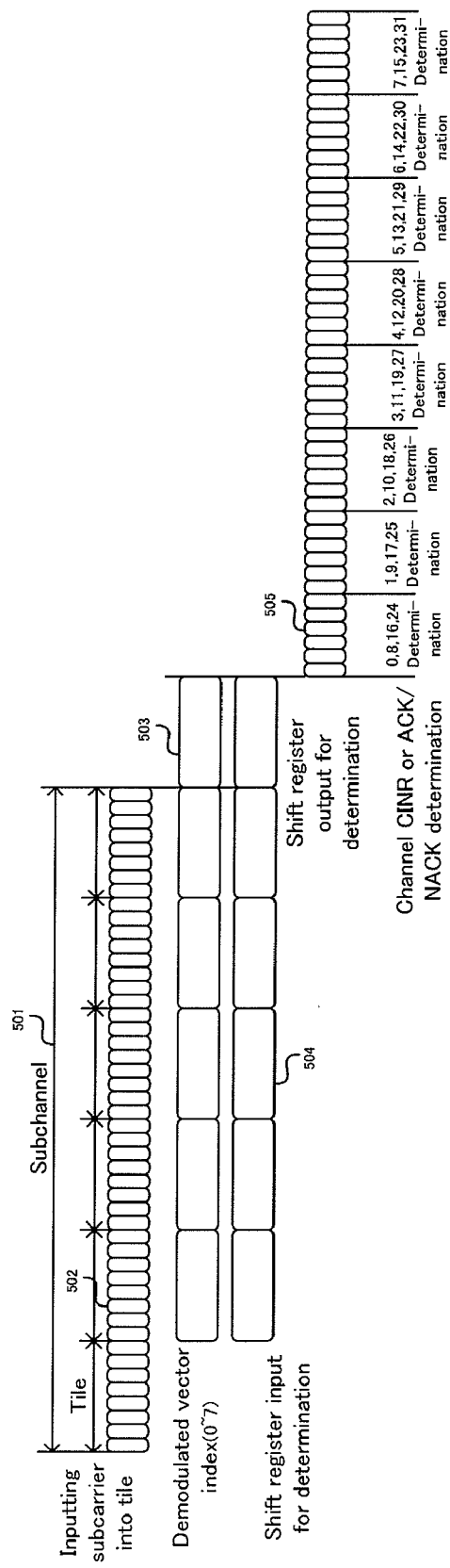
FIG. 6 shows a diagram for representing an operation for modulating vector indexes and detecting a channel value in FIG. 4 and FIG. 5 according to the exemplary embodiment of the present invention.

FIG. 6 shows a diagram for representing an operation for modulating the vector index and detecting the channel value shown in FIG. 4 and FIG. 5 according to the exemplary embodiment of the present invention.

As shown in FIG. 6, when a subcarrier is inputted to 6 tiles forming one subchannel 501, the vector indexes 503 from 0 to 7 are demodulated by using the demodulator shown in FIG. 4, the vector index inputs to the first and second shift registers are performed by using the detector shown in FIG. 5. That is, the 6 demodulated vector indexes are inputted to the first shift register, and the 6 subsequent vector indexes are inputted to the second shift register.

Since the vector index inputs to the first and second shift registers are repeated 8 times, the channel CINR value or the ACK/NACK channel value is determined. That is, the channel CINR or the ACK/NACK channel has a value among the 32 level values according to an output of the shift registers.

Therefore, a hardware design configuration of the base station demodulator for detecting and modulating the channel quality information (CQI) and the response signal for the ARQ of the uplink between the subscriber station and the base station in an OFDMA method is provided in the exemplary embodiment of the present invention, While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A base station demodulator for demodulating channel quality information (CQI) or an automatic repeat request (ARQ) response signal transmitted from a subscriber station to a base station, the base station demodulator comprising:

a vector index demodulator for demodulating quadrature phase shift keying (QPSK) modulation signals transmitted by using m subcarriers in a tile by multiplying the QPSK modulation signals, in parallel, by m conjugate complexes corresponding to the m subcarriers, and determining the greatest value of the demodulation results as a vector index when the CQI tiles or the ARQ acknowledgement/negative-acknowledgement (ACK/NACK) channel tiles are sequentially inputted; and a channel value detector for inputting n vector indexes demodulated by the vector index demodulator to a first shift register, inputting n subsequent vector indexes to a second shift register, performing the above vector index input to the first and second shift registers m-times, and detecting a channel value for the CQI or the ARQ ACK/NACK;

wherein m and n are integers.

2. The base station demodulator of claim 1, wherein the vector index demodulator comprises:

m multiplexers for multiplying the QPSK modulation signals transmitted by using the m subcarriers in a tile by the conjugate complexes corresponding to them subcarriers in parallel when the CQI tiles or the ARQ ACK/NACK channel tiles are sequentially inputted;

m adders for respectively adding values obtained by multiplying the m QPSK modulation signals by the m conjugate complexes;

m signal amplitude measuring units for measuring amplitude of the m QPSK modulation signals; and m determining units for determining the greatest value of the demodulation results as the corresponding vector index according to values measured by the m signal amplitude measuring units.

3. The base station demodulator of claim 2, wherein the conjugate complexes are multiplied without the multiplier and the adder when the conjugate complexes are multiplied by $$\exp(j \cdot \frac{\pi}{4}).$$

4. The base station demodulator of claim 1 or claim 2, wherein m includes 8.

5. The base station demodulator of claim 1, wherein the QPSK modulation signals respectively become 1 when the QPSK modulation signals are respectively multiplied by the conjugate complexes of the QPSK modulation signals, and the QPSK modulation signals respectively become 0 when the QPSK modulation signals are multiplied by the other conjugate complexes.

6. The base station demodulator of claim 1, wherein the channel value detector comprises:

a first shift register for receiving the n vector indexes demodulated by the vector index demodulator;

a second shift register for receiving the subsequent n vector indexes demodulated by the vector index demodulator; and a channel value determining unit for performing the vector index input to the first and second shift registers m-times, and determining a channel value for the CQI or the ARQ ACK/NACK.

7. The base station demodulator of claim 6, wherein the channel value determining unit determines a value having the least difference between an output value of the second shift register and a predetermined value as the channel value for the CQI or the ARQ ACK/NACK after comparing the output value of the second shift register with the predetermined value.

8. The base station demodulator of claim 7, wherein the CQI is determined to be one of the 32 levels according to the determination of the channel value determining unit.

9. The base station demodulator of claim 7, wherein the ARQ signal is determined to be one of ACK and NACK according to the determination of the channel value determining unit.

10. The base station demodulator of claim 1 or claim 6, wherein n includes 6.

* * * * *